US008391926B2

(12) United States Patent
Seeor et al.

(10) Patent No.: US 8,391,926 B2
(45) Date of Patent: Mar. 5, 2013

(54) MULTI-BEAM-SHAPING STRUCTURE

(75) Inventors: Alexander Seeor, Kolbermoor (DE); Markus Mohr, Rosenheim (DE); Wolfgang Voges, Grassau (DE); Stefan Reichelt, Chieming (DE); Stefan Berger, Rohrdorf (DE); Hubert Polster, Kirchheim (DE); Ralf Häntsch, Raubling (DE)

(73) Assignee: Kathrein-Werke KG, Rosenheim (DE)

( * ) Notice: Subject to any disclaimer, the term of this patent is extended or adjusted under 35 U.S.C. 154(b) by 452 days.

(21) Appl. No.: 12/732,882

(22) Filed: Mar. 26, 2010

(65) Prior Publication Data

US 2011/0237315 A1 Sep. 29, 2011

(51) Int. Cl.
*H04M 1/00* (2006.01)

(52) U.S. Cl. .................................... 455/562.1; 342/368

(58) Field of Classification Search ............... 455/562.1; 343/757, 766; 342/367, 368, 377

See application file for complete search history.

(56) References Cited

U.S. PATENT DOCUMENTS

| | | | | |
|---|---|---|---|---|
| 6,677,896 | B2 | 1/2004 | Singer et al. | |
| 7,031,751 | B2 | 4/2006 | Hurler et al. | |
| 2004/0155828 | A1 | 8/2004 | Heinz et al. | |
| 2009/0040106 | A1 | 2/2009 | Le et al. | |
| 2010/0201590 | A1* | 8/2010 | Girard et al. | 343/766 |
| 2011/0156974 | A1* | 6/2011 | Kenington et al. | 343/763 |

FOREIGN PATENT DOCUMENTS

| | | | |
|---|---|---|---|
| DE | 600 28 466 | T2 | 12/2006 |
| EP | 2088641 | A1 | 8/2009 |
| WO | WO02/061877 | A2 | 8/2002 |
| WO | WO2009/102774 | A2 | 8/2009 |
| WO | WO2009/102775 | A2 | 8/2009 |

OTHER PUBLICATIONS

First Office Action in related German patent application (Mar. 26, 2010).

International Search in corresponding PCT/EP2011/000914 (Feb. 24, 2011).

International Preliminary Report on Patentability and WIPO's "translation" of the Written Opinion of the International Searching Authority from corresponding PCT Application PCT/EP2011/0090914 (Oct. 2, 2012).

* cited by examiner

*Primary Examiner* — Nguyen Vo

(74) *Attorney, Agent, or Firm* — Nixon & Vanderhye P.C.

(57) ABSTRACT

A multi-beam-shaping structure is distinguished by the following features: the multi-beam-shaping structure is provided with at least one electronic communication interface for controlling the multi-beam-shaping structure for setting the at least two radiation diagrams differently, the multi-beam-shaping structure comprises at least one driver, preferably comprising an electric motor, and preferably a power unit, the multi-beam-shaping structure comprises at least two first mechanical interfaces and/or coupling points, a drive connection engages on each of the at least two first mechanical interfaces and/or coupling points, the at least one driver of the multi-beam-shaping structure is connected to the at least two mechanical interfaces and/or coupling points via a multidrive, it being possible to actuate selectively at least one of the plurality of drive connections in each case via the at least one driver and the associated controller, and the number of interfaces and/or coupling points being greater than the number of driver.

22 Claims, 6 Drawing Sheets

MULTI-BEAM-SHAPING STRUCTURE

The invention relates to a multi-beam-shaping means according to the preamble of claim 1.

Beam-shaping means are used in particular in mobile communications, i.e. in mobile communications base stations, to set the radiation angle differently for the main source of a mobile communications antenna. Depending on the down-tilt angle, a respective mobile cell can be illuminated to different extents and thus be adjusted.

In beam-shaping means of this type, it is conventional to refer to a RET unit, i.e. what is known as a "remote electrical tilt" means, as is known for example from WO 02/061877 A2. However, with a beam-shaping means, it is possible not only for example to set a different down-tilt angle in the elevation direction using different phase shifter settings, but also to set the main radiation direction, and thus the main source of an antenna system, in the horizontal direction, i.e. with a different azimuth angle, in particular in an antenna array with a plurality of slots, for example by using phase shifters. Finally, with a beam-shaping means, it is possible not only to set a different alignment of the main radiation direction of an antenna system in the elevation direction and/or in the azimuth direction, but the radiation width can also be set differently in both the azimuth and the elevation direction, in such a way that the half power beam width of a main beam lobe can thus be set differently in this case. Likewise, it is also possible to carry out adjustments on the mechanical angle of an antenna, in particular the roll, pitch and yaw.

In other words, the previously known antennae are generally configured in such a way that at a mechanical interface provided for this purpose (for example on the lower mounting flange of the antenna housing), it is possible to install what is known as the RET unit, which comprises a motor as well as an electronic system for controlling the phase shifters integrated into the antenna by a mechanical conversion. The phase shift achieved in this manner has a direct effect on the beam characteristics, i.e. on the down-tilt angle of the antenna.

Using RET units of this type, it is in principle possible to set the beam characteristics of multi-antenna systems differently, the aforementioned RET motors for setting the main radiation direction of the antenna being usable not only in the vertical direction (i.e. in the elevation direction to set a different down-tilt angle), but also in the horizontal direction (i.e. in the azimuth direction), and also even for setting the half power beam width of a main lobe.

In this case it is in principle known that the control unit, what is known as the RET unit together with the associated motor, can be arranged inside the antenna arrangement, i.e. therefore inside the radome. However, by contrast WO 02/061877 proposes to add an RET unit of this type outside the radome, preferably directly below a mounting flange of the antenna arrangement, and this has the advantage that an RET unit of this type can be retrofitted without actually opening the antenna cover (radome).

Based on site-sharing scenarios (in which network operators share a site) and what are known as co-siting scenarios (in which a network operator operates at one site, a plurality of base stations, possibly of different mobile communications generations or mobile communications technologies), higher numbers of antennae are increasingly being installed at each site. At least since the introduction of UMTS, a large number of the installed antennae have been supplemented by a system which ultimately makes it possible to control the beam characteristics of the antennae electrically. This is the RET configuration disclosed above with which a down-tilt angle can be set differently remotely.

Generally, the various antenna manufacturers have produced their own, i.e. proprietary mechanical interfaces for this purpose, the respective configurations varying between what are known as single- and multi-beam-shaping means (actuators) among manufacturers.

The actuation side of the RET actuators is specified in the AISG or 3GPP standard. Thus, the RET actuators of various antenna manufacturers can be controlled with one control device via this standardised interface. To cover single and multi RET actuators in the standard, two device types "single RET" (device type 0x01) and "multi-RET" (device type 0x11) were specified for this purpose in the standard.

A possible arrangement of a multi RET is for example accommodated in a single housing which is provided with a plurality of the manufacturer-specific mechanical interfaces. After a corresponding multi-band antenna has been mounted, the multi RET can then regulate the beam characteristics of the individual bands under the control of a control device. However, this embodiment is only possible or expedient if the plurality of mechanical interfaces on the antenna make it possible to operate it with a single device.

For multi-band antennae of other manufacturers, a multi RET solution of this type in a single housing is not necessarily possible, and this is because of the different configurations of the mechanical interfaces. Said interfaces may optionally also be located in different positions depending on antenna type.

A multi-beam-shaping means in the form of a multi RET means is known for example from WO 2009/102775 A2, and is provided with three manually actuatable adjustment axles, so as to be able to control three separate antenna arrays. To simplify the overall construction, it is proposed to use a joint control means for all three beam-shaping means.

Further, a multi-beam shaping means is also known from WO 2009/102774 A2, and comprises corresponding input and output axles for controlling the antenna means. In this case, an option to decouple the direct current motor of the drive means from the phase shift adjustment shaft is proposed, so as make it easier to operate the phase shifter control buttons manually.

Multi-band antennae are thus equipped with the aforementioned "single RET actuators" according to band. Therefore, the possibility, available to the manufacturer of a "multi RET" (which can be provided in a single housing), of reducing the cost of the "antenna plus RET" system cannot be exploited by every antenna manufacturer.

The object of the present invention is therefore to provide an improved solution for a multi-beam-shaping means, what is known as a multi RET arrangement, in which the beam characteristics can be set differently in an improved and in particular simplified manner by comparison with conventional solutions in an antenna transmitting in at least two bands or when there are a plurality of antennae per site. In this case, the beam shaping is intended to provide for example a different setting of the radiation direction in the vertical direction (in the elevation direction using a down-tilt angle) and/or in the horizontal direction (i.e. for a different setting of the azimuth angle of the main lobe) and/or generally to alter the beam characteristics in shape, for example in such a way that the half power beam width of the main lobe of the antenna system can be set differently.

The object is achieved according to the invention by the features specified in claim 1. Advantageous embodiments of the invention are provided in the sub-claims.

The invention proposes a solution which is considerably more advantageous than the prior art, and which is suitable for example for a multi-band antenna (which transmits and/or receives in at least two frequency bands) or for a dual-sector antenna configuration (comprising at least two antenna sectors of which the down-tilt angle can be set to be different). In other words, the beam-shaping means according to the invention comprises for example what is known as an RET means or unit, which comprises for example only one drive unit (for example an electric motor, an actuator, etc.) and only one associated electronic system, i.e. in particular only one microprocessor and preferably also only one motor driver. This so-called RET means is therefore understood to be an abbreviated reference to the beam-shaping means according to the invention, which for example provides different setting of a down-tilt angle, but also different setting of an azimuth angle, i.e. in other words makes it possible for the main lobe to radiate in a different horizontal direction or generally in a different direction with respect to a vertical plane.

According to the invention, it is provided that a mechanical interface arrangement is provided, and is constructed for example for a dual-band or dual-sector antenna configuration in such a way that at least two axle or shaft connections can be driven, the end of which opposite the mechanical interface arrangement is connected to a relevant adjustment and/or transmission means for altering the down-tilt angle of the associated radiator means.

The construction is preferably of such a type that the individual antenna means which operate in a relevant frequency band and which are provided in another sector configuration can only be actuated selectively after one another in time. In this way, the shaft and/or axle connections between the mechanical interface arrangement and the corresponding adjustment and/or transmission means for adjusting the phase shifter to carry out a selective setting of the down-tilt angle and/or for selectively setting the azimuth angle (or thus generally for a different setting of the elevation angle and the azimuth angle) for the individual frequency bands or for the individual sectors of the antennae can selectively be set differently one after another. It would also theoretically be possible for all axle or connection means between the mechanical interface arrangement and the corresponding phase shifters which are to be set to be actuated simultaneously. However, this would require the provision of couplings which can be controlled separately at another location, in such a way that selectively, only the radiators provided in a particular sector of the antenna or the radiators provided for a particular frequency band can ever be adjusted accordingly in terms of the down-tilt angle thereof, and the other shafts or axles operate in a "blank" manner, because the phase shifters downstream therefrom are not actuated by opening the coupling.

The beam-shaping means according to the invention is further distinguished in that it preferably comprises only one communication interface, via which it receives the corresponding control signals from a control device for selectively setting the different down-tilt angle, it also being possible for example for a control device of this type to be integrated into an associated base station. Remote transmission from a remote location is also possible, for example via the base station or alternatively by radio, etc.

In a particularly preferred embodiment, the shafts or axles thus consist of what are known as flexible shafts or axles. In this way, it is possible to provide a highly variable connection between the mechanical interfaces of the beam-shaping means on the one hand and the connected mechanical interfaces of the antennae for actuating the adjustment and/or transmission means provided there for adjusting the phase shifter.

However, instead of flexible axles or shafts, it is also possible to use axles or shafts with universal couplings, which make a comparable variability possible.

It is likewise possible to use a plurality of rigid shafts or axles and further drive stages (for example drives which comprise bevel gears) to transmit the flow of forces to any desired phase shifters arranged in the antenna.

As stated above, the preferably flexible shafts or axles may be fixed to a mechanical interface on a transmission means of the relevant antenna, so as effectively to actuate via the transmission means the phase shifters provided in the antenna housing. Preferably, the flexible shafts or axles may end in what are known as RET couplings, which like conventional beam-shaping means may also be directly attached to and mounted on a corresponding interface, for example a downward-facing flange of a mobile communications antenna housing (radome). However, an arrangement is also possible such that the preferably flexible shafts or axles lead directly to the phase shifters in such a way as to set the phase shifters differently directly when the shaft or axle is actuated. In this case, integration of the entire multi-beam-shaping means into the antenna is possible, in which case only the communication interfaces would be accessible from the outside. It would likewise be possible for only the multidrives to be integrated into the antenna and for these to serve as a mechanical interface for the housing with the motor and electronic system. It is also conceivable for this multidrive interface to be provided recessed into the antenna, in such a way that mounting the housing with the motor and electronic system on this interface represents "quasi-integration".

In all cases it is compulsory for the multi-beam-shaping means to comprise at least two interfaces, and also in all cases at least two coupling points and/or at least some coupling positions.

In the following, the invention is explained in greater detail by way of the drawings, in which, in detail:

Figure 5:
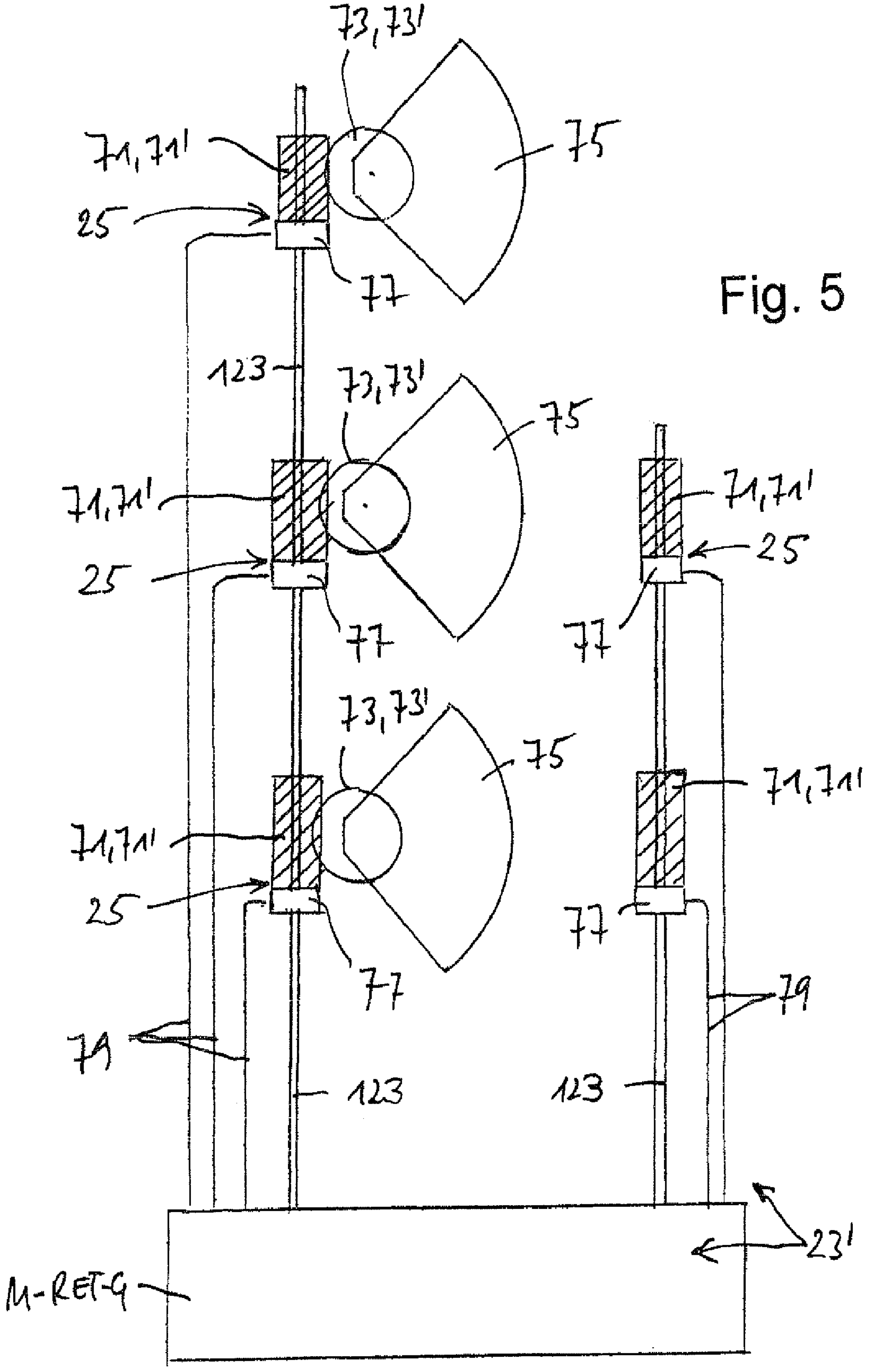
Figure 6:
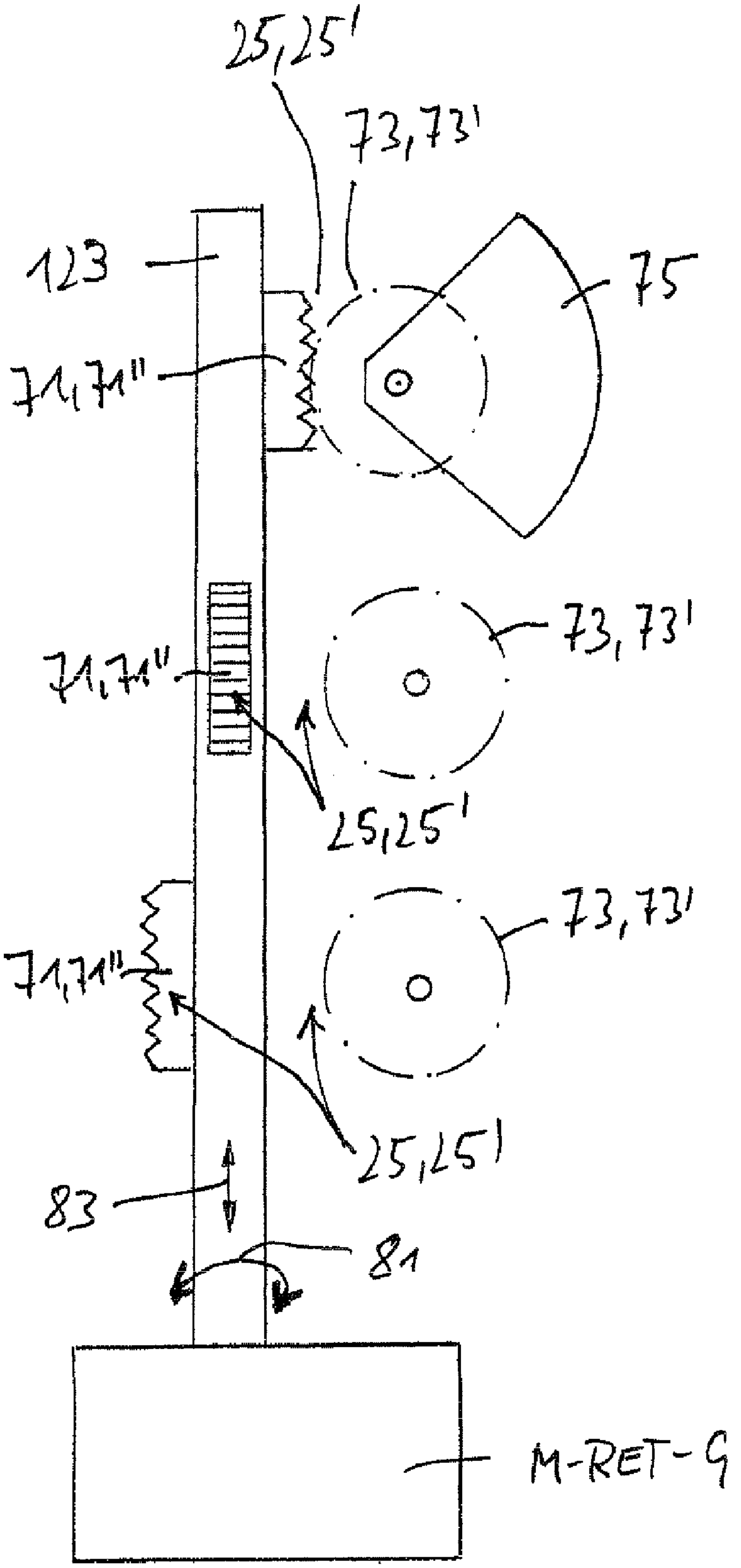

FIG. 5 shows a further embodiment, clarifying that the drive arrangement may also comprise only one drive train, on which various interfaces or coupling points may be provided in an offset manner for the branched displacement of adjustment members; and FIG. 6 shows a further schematic embodiment, also comprising only one drive train of the drive, optionally comprising only one interface or coupling point, which can however be brought into a plurality of coupling positions to drive different adjustment members.

Figure 1:
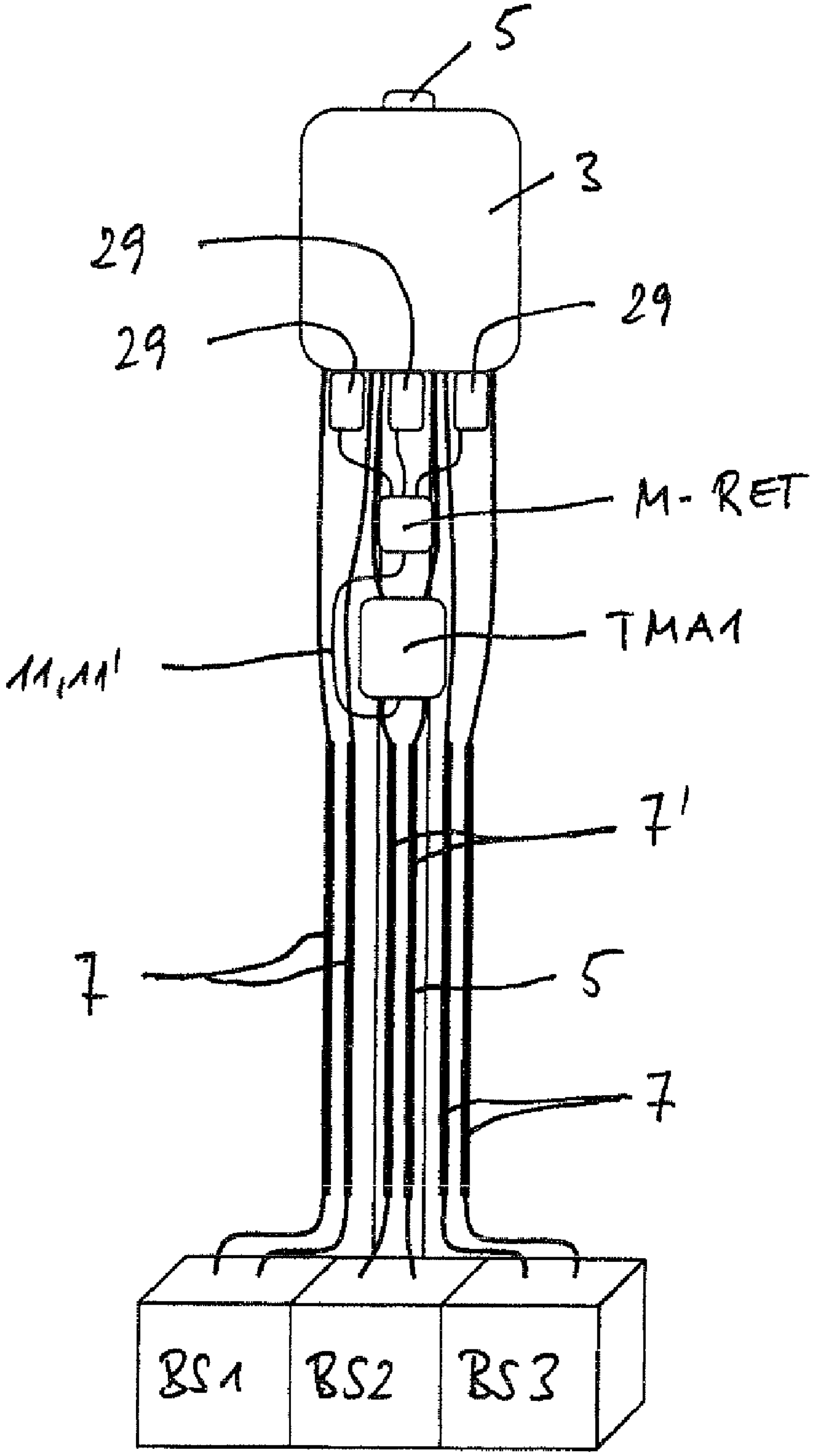
FIG. 1 is a schematic view of a first embodiment according to the invention of a multi-beam-shaping means in relation to a triple-band mobile communications antenna station.

FIG. 1 is a schematic view of a triple-band antenna station, a base station BS1, BS2, BS3 being associated with each of the three frequency bands to be transmitted. The various radiators and radiator arrangements for the three-band antenna arrangement are arranged below a radome 3 (generally inside or below an antenna cover 3) and are not shown in greater detail. On this matter, reference is made to known solutions.

In the variant according to FIG. 1, the radiators and radiator means are provided below the radome 3 on the upper end of an antenna mast construction 5, two HF feeder cables 7 in each case extending between the base station and the associated radiator means of the antenna for each frequency band of each base station BS1 to BS3.

Moreover, in the variant according to FIG. 1 a further amplifier means TMA1 is provided positioned close to the antenna, i.e. remote from base stations BS1 to BS3, the signals for controlling the multi-beam-shaping means travelling via the associated HF feeder cables 7' in this case too. If the antenna means according to claim 1 were basically a solution according to the prior art, the entire antenna arrangement comprising the three antenna means radiating in different frequency bands would comprise three single-beam-shaping means, and each antenna means provided for a frequency band would be associated with a separate single-beam-shaping means, which is conventionally referred to for short as a single RET, RET again standing for "remote electrical tilt". In this case, the amplifier means TMA1 would for example be provided with an AISG socket (for example an eight-pole plug-in socket connection), via which a communication bus for example in the form of a communication cable extends to the first single RET unit RET1 and from there to a respective subsequent RET unit.

However, in the present case, in the configuration according to the invention, a single multi-beam-shaping means M-RET is provided in such a way that merely a communication bus 11, for example in the form of a communication cable 11', leads from the amplifier means TMA1 to this multi RET unit M-RET.

Figure 2:
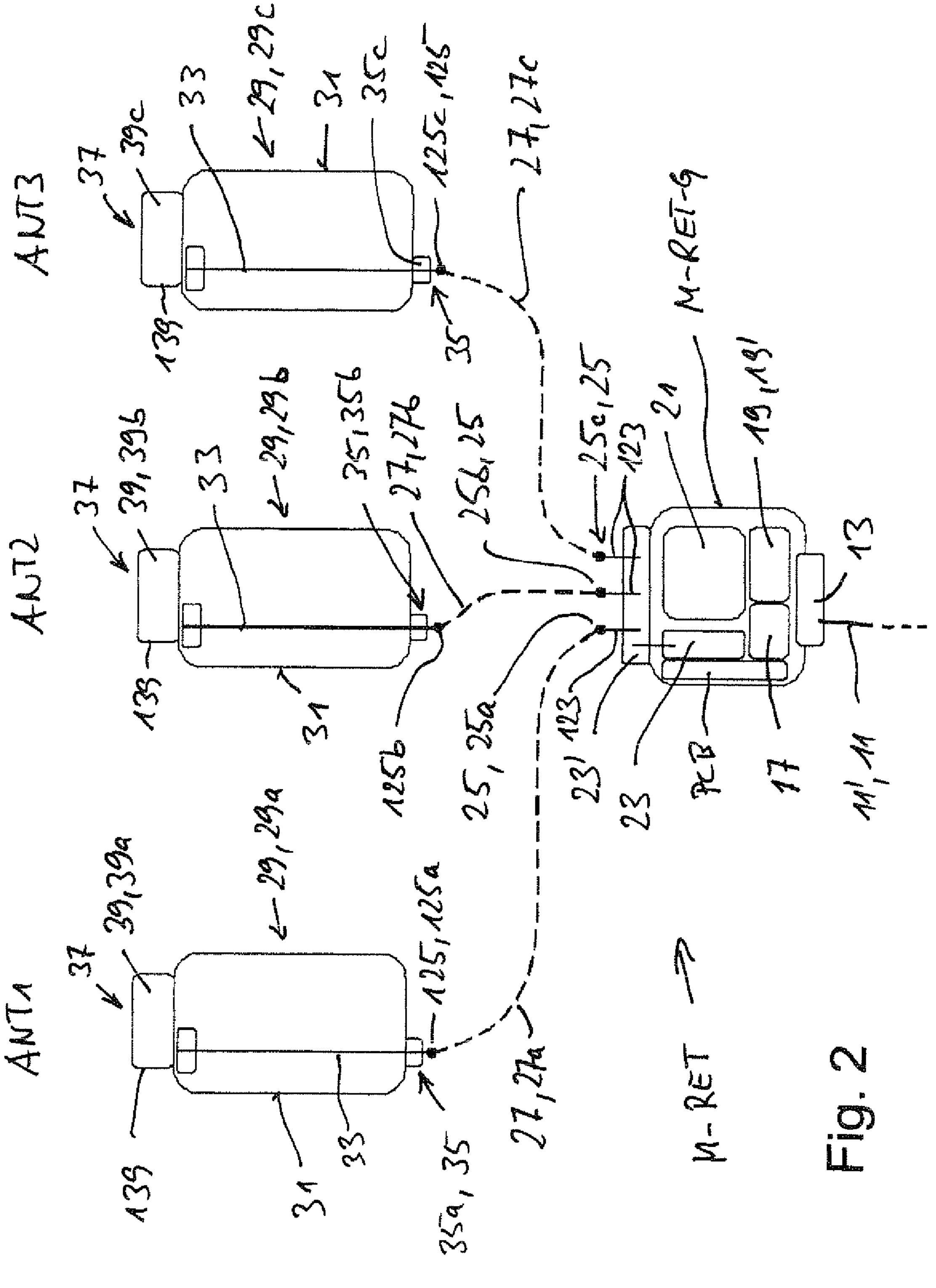
FIG. 2 is an enlarged detail of the multi-beam-shaping means according to the invention in relation to a first embodiment comprising a flexible axle or shaft for the corresponding control of a transmission means in the individual antenna sectors or the individual antenna means transmitting in a particular frequency band.

FIG. 2 shows an overall arrangement which is simplified as regards the further detail.

In this embodiment, the overall antenna arrangement ANT thus comprises three individual antenna means ANT1, ANT2 and ANT3, which act as separate antenna means and radiate, i.e. transmit and/or receive, in three different frequency bands.

FIG. 2 thus shows the three antennae or antenna sectors ANT1 to ANT3, via which connection couplings 29, described in greater detail below, are indicated only in the abstract position thereof, corresponding antenna elements not being shown in FIG. 2.

For the separated radiator down-tilt and/or for the beam alignment not only in the elevation direction but also in the horizontal direction and/or for an optionally possible beam shaping by setting a different half power beam width of these three antenna means ANT1, ANT2 and ANT3, a multi-beam-shaping means M-RET is provided in the embodiment shown and will also be referred to in the following as M-RET for short. Likewise, it is also possible to carry out adjustment on the mechanical angle of an antenna, specifically roll, pitch and yaw. Therefore, generally within the scope of the multi-beam-shaping means according to the invention, any desired beam-shaping can be carried out within wide ranges, in such a way that, in other words, a radiation diagram of a corresponding antenna means, in particular a mobile communications antenna means, can be accordingly set and/or adjusted by one or more of the above-mentioned measures or in another manner.

This multi-beam-shaping means M-RET comprises a communication interface 13, via which a communication bus 11, for example in the form of a corresponding (for example eight-wire) communication cable 11', is connected directly or indirectly to a control device, which may for example be integrated into a base station BS1, BS2 or BS3, via the aforementioned amplifier means TMA1. Thus, an AISG plug may for example serve as a communication interface (as is also the case in the prior art). The aforementioned control device, which may for example be integrated into the base station and is not shown in greater detail, can communicate with the aforementioned multi-beam-shaping means M-RET (device type 0x11) by means of a suitable protocol, for example an AISG/3GPP protocol.

As is also shown schematically in FIG. 2, the multi-beam-shaping means comprises for example a printed circuit board PCB, a lightning protection means 17, a power supply means 19 (also sometimes referred to in the following as an internal power unit 19'), a microprocessor 21 with associated motor drivers and an electric actuator 23 (for example in the form of an electric motor, a stepper motor, a magnetically actuatable adjustment means, etc.), which is connected to an associated switching and transmission drive 23' having a first mechanical interface and/or coupling arrangement 25.

In the embodiment shown, the first mechanical interface and/or coupling arrangement 25 comprises three separate first mechanical interfaces and/or coupling points 25*a* to 25*c*, which each are or can be connected to a drive connection 27, in the embodiment shown three drive connections 27*a* to 27*c*. These lead at the opposite ends 125, i.e. 125*a* to 125*c*, thereof to a second mechanical interface 35, i.e. 35*a* to 35*c*, via which the respective drive connections 27*a* to 27*c* are connected to and in a driving connection with a connection coupling 29 associated therewith. These interfaces 125 provide a connection from the drive connection 27*a* to 27*c* thereof to the connection couplings 29 associated therewith, in the embodiment shown connection couplings 29*a* to 29*c*, which as in the prior art may also be attached to and mounted on a mechanical antenna interface 39 (RET interfaces 39*a* to 39*c*) on the individual antenna provided for a particular frequency band (generally comprising a plurality of radiators or radiator arrangements), for example as is indicated and disclosed in WO 02/061877 A2 for an individual retrofittable beam-shaping means.

The connection couplings 29 comprise for this purpose a coupling housing 31, in which a connection axle or shaft 33 may be accommodated optionally together with an additional drive transmission, via which a drive connection is produced between the terminal 35 on the multi-beam-shaping means side and the terminal 37 on the antenna side. At the terminal 37 on the antenna side, a threaded sleeve 139 may for example be provided, via which the aforementioned connection coupling 29 for example, as described in patent WO 02/061877 A2, can be attached to the associated antenna means in such a way as to adjust accordingly, via this interface, the phase shifters provided in the antennae.

The aforementioned drive connections 27*a* to 27*c* preferably consist of a flexible axle or of a flexible shaft 27, but may also be constructed and formed in such a way that the respective flexible axle or flexible shaft 27 consists of rigid shaft or axle portions and these are respectively supplemented by resilient or flexible intermediate axle or shaft portions, universal couplings etc. so as to provide a connection from the mechanical interface 25*a* to 25*c* to the connection interfaces 125 on the associated coupling housings 31.

The multi-beam-shaping means M-RET is thus constructed in such a way that the mechanical and electronic portion inside the RET housing M-RET-G is identical or largely identical, i.e. at least similar, to a conventional, simple single-beam-shaping means, it being possible for a preferably replaceable multi-axle drive 23, (i.e. generally a drive comprising a plurality of drive and/or branching trains, also sometimes referred to in the following as a multi-shaft drive or multi-axle drive or simply as a multidrive or multidrive means 23') to be constructed in the region of the output shaft of the electric motor 23 in this case, and provided with a corresponding number of drive shafts 123 in accordance with the number of single antennae to be adjusted, the preferably flexible shafts 27 subsequently preferably being attached to the mechanical interfaces and/or coupling points 25 of said drive shafts. This construction results in a substantial cost reduction, because the valuable components such as motors, microprocessors, control circuits, etc. need only be constructed once, and not a plurality of times as in a conventional arrangement with a plurality of individual beam-shaping means. Therefore, preferably only one joint drive means, for example comprising preferably only one electric motor 23 with preferably only one control means with only one microprocessor 21, is provided.

The construction and operation of the described multi-beam-shaping means M-RET is such that appropriate control signals via the electronics in the multi-beam-shaping means M-RET now make it possible to control selectively each of the specific mechanical first interfaces and/or coupling points 25*a*, 25*b* or 25*c*, via which the flexible axle or shaft 27*a*, 27*b* or 27*c* attached thereto is selectively actuated, in such a way that hereby, via the subsequent coupling housing 31, the phase shifters accommodated in an antenna means ANT1, ANT2 and ANT3 may be adjusted selectively, so as specifically to alter the down-tilt angle of the radiator means provided in this respective antenna arrangement ANT1 to ANT3.

In other words, the individual mechanical interfaces and/or coupling points 25*a* to 25*c* are correspondingly controlled temporally after one another, in such a way that only one drive connection 27*a* to 27*c* is ever activated and actuated.

It would also in principle be possible to provide selective control of the phase shifters accommodated in a radiator means ANT1, ANT2 and ANT3 in that of the drive connections 27*a* to 27*c* by means of the mechanical interface 25, are set in rotation and/or displaced in the longitudinal direction in accordance with the adjustment mechanism which is to be applied, (for example in the manner of a Bowden cable arrangement, in which a sheathed cable is guided in a longitudinally displaceable manner, for example against the force of a spring means, in a tubular casing), subsequently however separately adjustable couplings 31*a* to 31*c* would have to be accommodated in the coupling housings 31 for example. These couplings would then have to be locked selectively in such a way that only the downstream phase shifter in a relevant antenna arrangement ANT1, ANT2 or ANTS is adjusted in terms of the down-tilt angle thereof, and the other flexible shafts only lead to open couplings, and the phase shifters or the other antenna means are thus not also adjusted.

Figure 3:
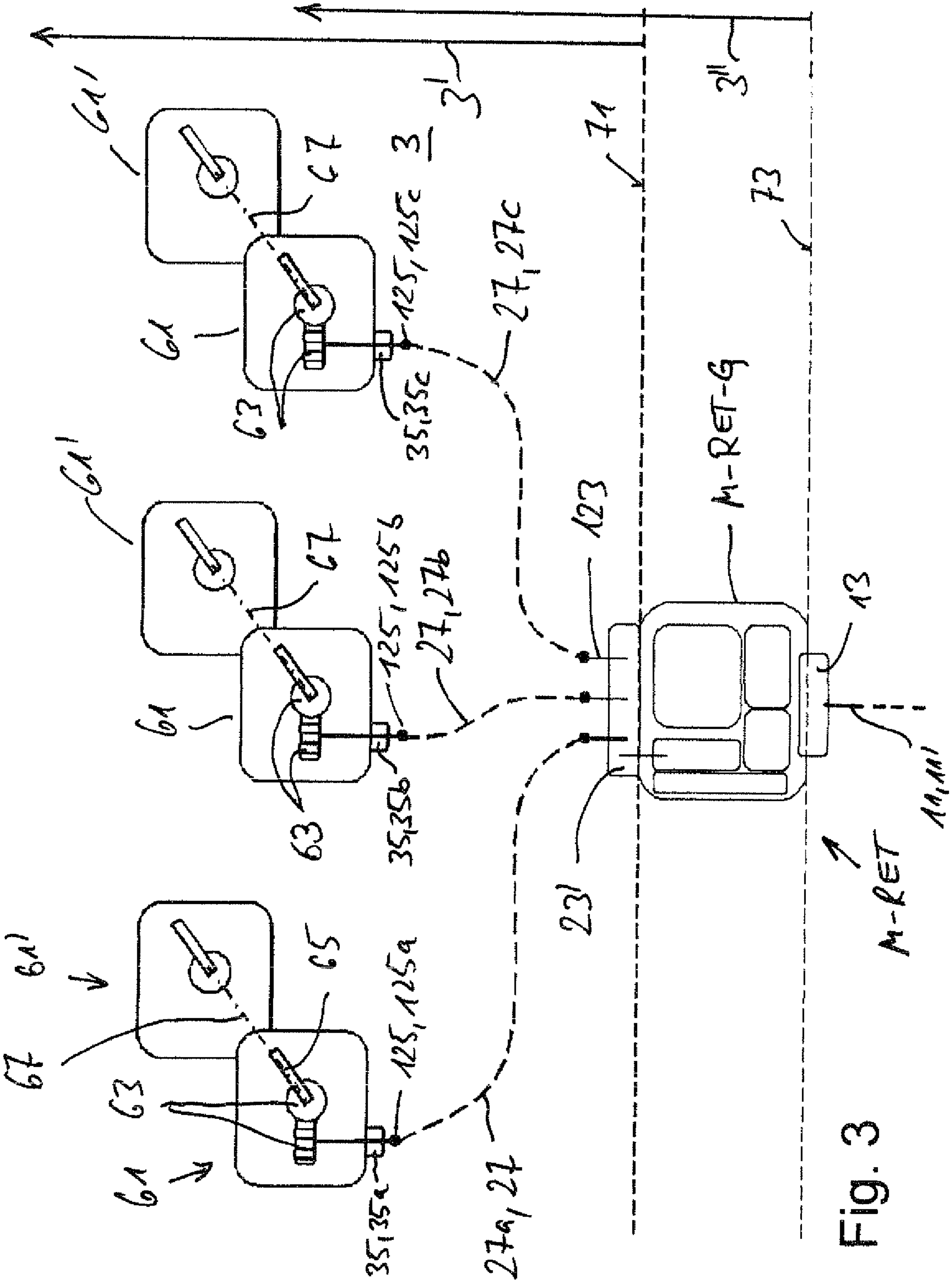
FIG. 3 is a schematic view of an embodiment modified by comparison with FIG. 2.

FIG. 3 shows an embodiment which varies in that, in this case, no separate coupling housings 31 are provided, and instead the preferably flexible drive connections 27*a* to 27*c*, in particular in the form of a flexible axle or flexible shaft, are attached directly to the phase shifters 61 (in this case in the region of the mechanical second interface 35, i.e. 35*a*, 35*b* or 35*c*, thereof on the end 125, i.e. on the respective end 125*a*, 125*b* or 125*c* of the drive connections 27*a* to 27*c*), in such a way that it is possible to produce a direct connection to the transmission means and/or adjustment means provided inside the antenna arrangement (for example inside the radome, i.e. the antenna cover) for adjusting the phase shifter 61 and thus for adjusting a down-tilt angle, in the elevation direction, of a different radiation angle in the azimuth direction and/or beam-shaping while setting a different half power beam width, etc. In this way, it is conceivable to integrate the entire multi-beam-shaping means into the antenna, only the communication interfaces and/or coupling points being accessible from outside. Likewise, it would also be possible for only the multidrive to be integrated into the antenna and to act as a mechanical interface for the housing with the motor and electronic system. It is also conceivable for this multidrive interface to be arranged recessed in the antenna, in such a way that mounting of the housing with the motor and electronic system on this interface represents a "quasi-integration".

The embodiment of FIG. 3 may also be one in which various phase shifters of a single antenna means are controlled by means of the multidrive arrangement according to the invention. It is likewise also possible for a plurality of single-band antennae or a combination of multi-band antennae and single-band antennae to be provided inside the antenna cover 3.

In principle, the mechanical angle of an antenna can also be set differently using the beam-shaping means according to the invention, for example, i.e. a different roll, pitch or yaw setting can be provided. There are no limitations in this respect. Thus, a different setting and/or alteration of a radiation diagram can be carried out with all the described measures (i.e. therefore a different setting of the radiation diagram of a radiator means, thus generally of an antenna or antenna means and in particular of a mobile communications antenna system).

Thus, in the case according to FIG. 3, an even greater cost reduction is achieved than in the embodiment of FIG. 2, since the RET couplings 31 are no longer required and it is also optionally possible, in the case of complete integration into the antenna, to omit the housing of the multi-beam-shaping means.

The aforementioned phase shifters, which are driven by the flexible axles or shafts 27, may be constructed in a conventional and/or suitable manner. They may thus—as is indicated only schematically in FIG. 3—for example comprise mutually interlocking drive gear wheels 63, by means of which transmission of the rotational movement and/or conversion of the torque can be provided. By means of a phase shifter or phase shifter lever 65, it is then possible to carry out the adjustment of the phase shifter and thus the production of a desired phase shift in each case. These may be suitable phase shifters, for example differential phase shifters, etc.

Likewise, mechanical coupling of a plurality of phase shifters is also conceivable, and it would then be possible for said phase shifters to be driven synchronously by a flexible axle 27*a* to 27*c*. Thus, for example, in the embodiment of FIG. 3, another, second phase shifter means 61' is provided in each case, and is coupled for example via a mechanical coupling 67, not shown in greater detail, to the respective first phase shifter 61.

FIG. 1, and also the schematic enlarged detail of FIG. 2, show that for example the multi-beam-shaping means M-RET with the housing M-RET-G thereof can be arranged outside and above all below the antenna cover (i.e. the radome) at a distance therefrom, in such a way that the flexible shafts or axles 27 (for example protected in the manner of a Bowden cable by a cover not shown in greater detail) extend in the open air between the multi-beam-shaping means M-RET and the antenna means or the antenna cover. In particular in a variant according to FIG. 3, but also in the embodiment according to FIG. 2, the multi-beam-shaping means or parts thereof may also be more or less integrated into the housing of the antenna cover.

For this purpose, a first integration line 71 is shown in FIG. 3 and is intended to show that for example the multi-axial drive 23' can be accommodated in part or completely inside the antenna housing cover 3, since the antenna cover or what is known as the radome 3 extends in the direction of the arrow 3' from the integration line 71, and thus the multi-axial drive 23 comes to lie, as stated above, in part or completely inside this antenna cover 3.

However, it is also possible that not only the multi-axial drive 23', but also the housing of the multi-beam-shaping means M-RET, i.e. the housing M-RET-G, is integrated completely or in part inside the antenna cover 3, specifically when the antenna cover, i.e. the radome 3, extends in accordance with the arrow 3", starting from the integration line 73, in the direction of the arrow 3".

This integration line 73 or even the above-mentioned integration line 71 may however move between the two regions shown in FIG. 3 in such a way that the housing M-RET-G is located not only completely, but also possibly only in part, in the interior of the housing cover 3.

Finally, it is thus also shown that for example the communication interface 13 may lie completely or in part outside the radome or the antenna cover 3, or alternatively only in part or almost entirely inside the radome, in such a way that only the actual interface access is actually still accessible from outside or from below.

The communication interface 13, mentioned a plurality of times above, may be configured differently depending on the type of application of the control system, for example as an AISG plug or as a modem connected to the antenna feeder cable.

Figure 4:
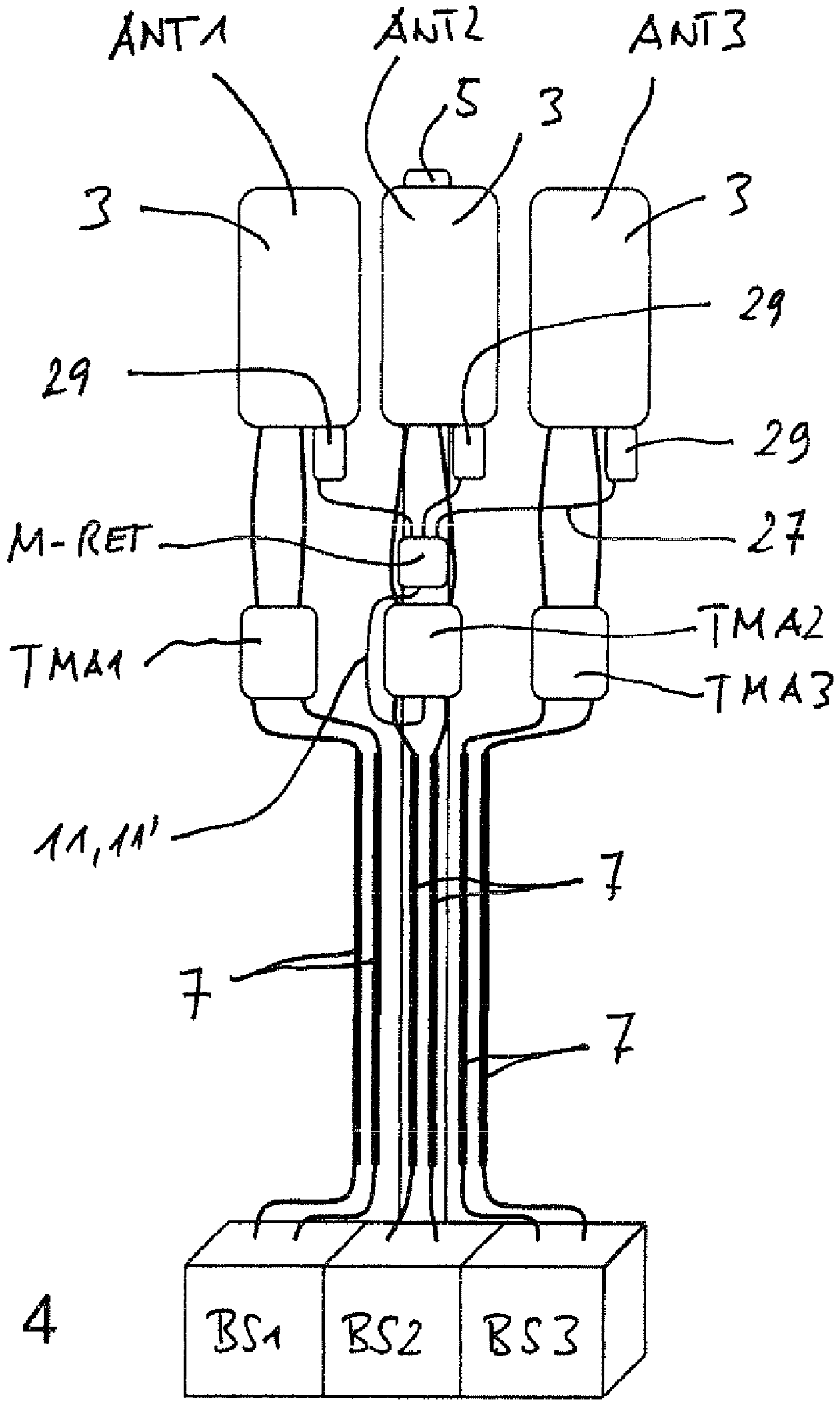
FIG. 4 is a view similar to FIG. 1 but for a three-sector antenna configuration.

Finally, reference is further made to the embodiment of FIG. 4, which discloses a corresponding solution according to the invention, not for the case of a triple-band antenna arrangement, but for a tri-sector antenna configuration, in which three individual antennae ANT1, ANT2, ANT3 are aligned in three different sectors and can be controlled individually via the multi-beam-shaping means M-RET, in such a way as to be able to set the down-tilt angle and/or for example the azimuth angle for the radiation direction and/or beam-shaping with different setting of the horizontal beam width separately and differently for each antenna sector ANT1 or ANT2 or ANT3.

Thus, in FIG. 4 three amplifier units TMA1, TMA2 and TMA3 are also provided, which are each powered via the feeder cable 7 and of which the corresponding further feeder cables extend to control the antennae. The corresponding control signals for the multi-beam-shaping means M-RET can in this case, via one or a pair of feeder cables, starting from a base station, be transmitted for example to one of the amplifier units, for example the amplifier unit TMA2, the control signals subsequently being transmitted via a control fine 11, for example in the form of a corresponding control cable or control bus 11', to the multi-beam-shaping means M-RET, whereby subsequently the phase shifters 61, 61' accommodated in the individual antenna means can be controlled accordingly to carry out the beam shaping by means of the flexible shafts or axles 27 on the optionally provided coupling means 29.

By means of the multi-beam-shaping means M-RET described in the context of the invention, beam shaping may thus be carried out in the vertical and/or horizontal direction to set a different down-tilt angle in the elevation direction and/or to set a different radiation direction in the horizontal direction, i.e. with a different azimuth angle and/or else a different setting of the antenna characteristics, in such a way that for example a different half-power beam width can be set in addition or as an alternative to the above-mentioned adjustment possibilities with the aforementioned RET units. In this respect, it is thus possible in the context of the invention for the radiation characteristics of multi-beam systems, i.e. in particular including multi-mobile-communication systems, to be adjustable in different ways according to circumstances and customers' wishes using the master beam-shaping means. These different radiation characteristics may thus be set in a manner correspondingly adjusted by means of the RET motors which are used.

The following refers to a modified embodiment according to FIG. 5, in such a way as to clarify that the drive arrangement generally referred to as a "multidrive" need not comprise a plurality of interfaces or coupling positions branched in parallel, but may also merely comprise a drive train on which at least two corresponding interfaces and/or coupling points or at least two different coupling points are provided or are possible, in such a way that it is possible for example selectively to actuate one or other of the phase shifter assemblies or another adjustment member or an adjustment means in the antenna arrangement.

FIG. 5 thus schematically shows the multidrive means 23', in which for example two offset drive shafts 123 are shown. In a variant, it would also be possible for only a single drive shaft 123 to be provided.

Adjustment members or actuation elements 71 are positioned on this drive shaft 123 in an offset arrangement, for example in the form of a screw 71', which cooperates with a corresponding transmission and/or adjustment means 73, for example in the form of a gear wheel 73'. The gear wheel is thus shown schematically in a side view in FIG. 5, i.e. with an orientation positioned perpendicular to the plane of the drawing and thus perpendicular to the drive axle 123. In this case for example a phase shifter including a phase shifter arrangement 75 can be actuated directly or indirectly. The arrangement may be such that the shaft 123 can be set in rotation to the right or to the left by means of the multidrive arrangement 23' in order to adjust the phase shifter.

To actuate selectively a particular one of the three phase shifter means 75 shown on the left in FIG. 5, a coupling arrangement 77 is associated with each adjustment or actuation member 71 and can be actuated via a separate coupling actuation means 79. This coupling actuation means 79 may for example be constructed from a control means in the form of a cable, a sheathed cable, a rod, a lever, etc. and/or from combinations thereof. In other words, the coupling means can be actuated or triggered mechanically, or actuated or triggered electrically, or electronically or actuated and/or triggered by combinations of these. There are no limitations or restrictions in this respect. These coupling actuation means 79 preferably also lead to the multidrive means 23 or at least to the housing MRET-G of the multidrive means 23'.

By actuating a corresponding coupling 77, the associated screw 71', i.e. the associated adjustment member 71, can in each case be brought into rigid rotational engagement with the shaft. In this way, when the shaft 123 rotates it is possible for the uppermost, the middle or for example the lowest of the phase shifters 75 shown on the left in FIG. 5 to be adjusted selectively in two opposite directions.

This arrangement therefore also leads to interfaces or coupling points 25, i.e. in the present case interfaces and/or coupling points 25*a*, 25*b*, 25*e*, via which a transmission and/or adjustment means 71 for setting the radiation diagrams differently can in each case be connected to the associated drive train of the drive arrangement. The drive shaft 123 is thus preferably understood to be part of the multidrive means 23' within the meaning of the invention.

FIG. 5 also shows that an arrangement of this type comprising a drive shaft 123, and thereon a plurality of interfaces and/or coupling points 25 positioned offset in the axial direction, can also be formed a plurality of times on the drive arrangement, and for this reason a further drive axle 123 is shown positioned on the right in FIG. 5 for example, but in this case only comprising for example two adjustment and/or actuation members 71 positioned offset in the axial direction and a respectively associated coupling means 77 comprising associated coupling actuation means 79.

FIG. 6 shows a further modification, in which furthermore there is also only one drive train 123, via which, however, a plurality of phase shifter arrangements 75 can be controlled in this case too.

For this purpose, a first phase shifter arrangement 75 is shown in the top right of FIG. 6, together with a corresponding transmission and/or adjustment means 73 for example in the form of a gear wheel 73', via which the phase shifter can be set differently similarly to FIG. 5. Likewise, in this embodiment phase shifter means 75, in the embodiment shown 3, are to be provided positioned offset in the longitudinal or axial direction of the drive shaft 123, only the associated transmission and/or adjustment means 73 of each of the two further phase shifters 75 being shown, for example in the form of a gear wheel 73'.

In this embodiment, a plurality of corresponding adjustment members, i.e. corresponding adjustment or actuation means 71, are provided positioned offset in the circumferential direction, for example in the form of a toothed rod portion 71".

In this embodiment, the drive train 125 can not only be adjusted in the clockwise and anticlockwise direction, i.e. rotated in the direction of the double-headed arrow 81 about the longitudinal axis thereof, but also extended and retracted, i.e. also adjusted, in the direction of the further double-headed arrow 83, in the longitudinal direction of the drive axle.

If for example the phase shifter 75 shown at the top right in FIG. 6 is to be adjusted, the drive shaft 123 is initially extended until the associated adjustment member, i.e. the actuation means 71 in the shape of a toothed rod, comes to lie at the level of the transmission and/or adjustment means 73, for example in the form of a gear wheel 73'. Subsequently, the drive train is rotated in the clockwise or anticlockwise direction until the actuation means 71 in the shape of a toothed rod comes into engagement with the transmission and/or adjustment means 73, for example in the form of a gear wheel 73'. Subsequently, by further axial extension or retraction, i.e. by axial longitudinal adjustment, an axial longitudinal adjustment can be converted into a rotational movement with respect to the gear wheel 73' and the phase shifter can thus be adjusted in two opposite directions as desired.

This defines an interface and/or coupling point 25 for example, which in this case also describes a coupling position 25', i.e. a coupling means having three coupling positions 25'*a*, 25'*b* and 25'*c*. These coupling positions 25', i.e. 25'*a*, 25'*b* and 25'*c*, thus merely represent a special case of the general interface and/or coupling point 25, i.e. 25*a*, 25*b* and 25*c*.

In order subsequently to drive the central phase shifter 75 in the drawing of FIG. 6, for example, the drive shaft 123 is for example pivoted in the clockwise or anticlockwise direction by 90° for example, so as then to be shortened by being retracted further into the multidrive housing M-RET-G, i.e. by axial displacement until the adjustment or actuation means 71 comes to lie at the level of the second transmission and/or adjustment means 73 of the phase shifter assembly. The actuation member 71 is also shown for this position in FIG. 6. In this position, the drive train 125 will subsequently be rotated again until the actuation means 71" in the form of a toothed rod, shown in the central position, comes into engagement with the subsequent transmission and/or adjustment means 73 in the form of a subsequent gear wheel 73'. If the drive train is subsequently extended or retracted a little, this axial movement is converted into a rotational movement of the transmission and/or adjustment means 73 and the phase shifter is thus adjusted.

This engagement can be released again in a corresponding step, and the drive shaft can thus be adjusted and retracted downwards until the adjustment and/or actuation member 71 comes to lie at the level of the lowest transmission and/or adjustment means 73 in the form of a gear wheel, in such a way that after a corresponding further rotational movement of the drive shaft 123, the lowest gear wheel 73' and thus the lowest phase shifter assembly can be accordingly adjusted.

In this case, at least when the three transmission and/or adjustment means 73 are taken into consideration, the embodiment also comprises three interfaces and/or coupling points 25, defining three coupling positions 25' based on the drive train 125, so as selectively to actuate one of the phase shifter assemblies or other adjustment means of the antenna.

Purely for completeness, it is also noted that in the embodiment of FIG. 6, not only the described single adjustment and/or actuation means 71, 71", in the form of a gear wheel or otherwise, need be provided, but for example three adjustment and/or actuation means 71, 71" may be provided in the circumferential direction of the drive train 125, positioned offset in the axial direction, in such a way that with a corresponding rotational movement, i.e. rotational movement of the drive train or of the drive shaft 123, depending on the angular position, only one of the uppermost, the central or the lowest adjustment or actuation means 71, in this case for example in the form of the aforementioned toothed rod 71", can be brought into an operative connection with one of the three transmission and/or adjustment means 73 in the form of a gear wheel.

A plurality of drive trains of this type may also be formed on the multi-RET unit, making it possible to increase the number of selectively controllable phase-shifters.

In all of the embodiments described, a switchable, in particular electromechanically switchable coupling or adjustment means may be integrated into the drive, as well as a corresponding drive control with one or more motors to carry out the adjustment movement.

In the context of the invention, it is thus always provided that only one or only one joint drive means, one actuator, one motor and in particular one electric motor, etc. is provided for at least two interface or coupling means or coupling positions for driving at least two adjustment means, i.e. in contrast to the prior art, fewer drive means, i.e. electric motors, actuators, etc., are provided than adjustable assemblies such as phase shifters which can be actuated selectively via said means. For this reason, in the context of the invention a correspondingly higher number of interfaces, coupling points 25 or coupling positions 25' than of drive means or drive units is provided.

It should further be noted that for setting or adjusting the controlled units, in particular phase shifters, there is one corresponding drive unit or there are fewer drive units than interfaces and/or coupling points in the context of the invention, although for example in the embodiment according to the example of FIG. 6, at least one adjustment motor may also additionally be provided. The purpose of the adjustment motor would be for example to adjust the drive shaft 123 with the associated adjustment and actuation elements 71, 71", in such a way that this adjustment and actuation element 71, 71" is displaced into a desired positioned in which a coupling with a corresponding transmission and/or adjustment means 73, in the form of a gear wheel in the lateral embodiment, is produced. In this way, the axial adjustment could also be carried out via the drive motor and the rotational movement for ultimately producing the coupling with the corresponding adjustment and actuation means 71, 71" could be carried via the adjustment or coupling motor. It would then be possible for the drive motor in turn to carry out an axial adjustment selectively in the longitudinal direction of the drive shaft, in such a way as subsequently correspondingly to control the phase shifter and to set a desired phase shift for the radiator elements. Thus, in this context, only two different adjustment steps are carried out by the drive unit and the adjustment unit, one motor carrying out the axial adjustment and the other motor the rotational movement, i.e. rotation, of the shaft. This is merely a division for two different adjustment steps of what is otherwise a joint drive means, i.e. a joint drive means for selectively adjusting for example two different phase shifters or phase shifter assemblies. Thus, the number of interfaces and/or coupling points is greater in all cases than the number of drive means, i.e. joint drive means, it also being possible, as described, for a drive means also for example further to comprise one or more additional adjustment or coupling drives or motors, so as to be able to produce a drive connection between the corresponding adjustment members. Using coupling or adjustment drives or motors of this type, the coupling means 77, also mentioned in reference to FIG. 5, with the associated coupling actuation means 79 can be actuated and adjusted accordingly, it then being possible, after a coupling connection has been produced (by means of an adjustment motor), for the connection for example of the connected phase shifter to be carried out by means of the drive means.

It can also be seen from the described embodiments that transmission of a force or torque via a plurality of rigid shafts or axles and additional drive stages is possible, in such a way that as in the described construction using flexible shafts or axles, it is for example possible to control phase shifters in the antenna which are positioned in different locations. In other words, the bridging between the drive arrangement or the multidrive housing M-RET-G and the corresponding assemblies to be controlled such as the phase shifters can be positioned at extremely varied points.

In this case, additional control means may further extend into the interior of the antenna from the M-RET unit, via which means the electromechanical actuators located there can be actuated, in such a way that the flow of force in the drive trains can be separated or closed. As stated, coupling means may be used for this purpose, which are arranged directly on the shaft or the drive train 123 of the drive arrangement or even on the phase shifter itself or in the vicinity of the phase shifter or other adjustable assemblies, as can be seen in particular from the embodiment of FIG. 5 (or alternatively FIG. 6).

Preferably, an electric motor is used as a drive means. However, any other controllable drive means are also in principle possible.

In the various embodiments, a multidrive or multidrive arrangement is often mentioned. In general, this is therefore a drive or drive arrangement with a plurality of drive or branch trains, it being possible for the branching to be coupled to the aforementioned interfaces and/or coupling points or to the switchable coupling positions with different subsequent adjustment members, phase shifters, etc.

Finally, it is also further noted that the multi-beam-shaping means M-RET may also be provided with at least one further communication interface, in such a way that a further multi-RET unit for controlling further antenna means can be attached for example in the manner of daisy-chain wiring. In this way, a plurality of multi-beam-shaping means connected in this manner can be controlled via a communication line 11, 11'.

The aforementioned multidrive can be used with all antenna constructions, in single-band antennae as well in dual-band or in general multi-band antennae.

The invention can be applied to antenna arrays with radiator means which are arranged in one or more slots. The radiator means may be single-polarity or multiple-polarity. There are no limitations in any respect.

The invention claimed is:

1. Multi-beam-shaping structure together with a joint control structure, for multi-mobile-communications antenna systems, comprising:
- at least one microprocessor,
- at least one electronic communication interface coupled to the microprocessor for controlling the multi-beam-shaping structure for setting at least two radiation patterns differently,
- at least one driver comprising an electric motor and a power unit,
- at least two first mechanical interfaces and/or coupling points,
- wherein a drive connection engages on each of the at least two first mechanical interfaces and/or coupling points,
- the at least one driver of the multi-beam-shaping structure being connected to the at least two mechanical interfaces and/or coupling points via a multidrive, and structured to actuate selectively the drive connection via the at least one driver and the microprocessor,
- wherein the number of interfaces and/or coupling points are greater than the number of drivers.

2. Multi-beam-shaping structure according to claim 1, further including a plurality of drive connections and wherein the multidrive comprises an electromechanically switchable coupling or adjustment structure, via which, in a controlled manner, a drive connection from the driver can only be produced to one of the plurality of drive connections.

3. Multi-beam-shaping structure according to claim 1, wherein the multidrive is replaceable.

4. Multi-beam-shaping structure according to claim 1, wherein the multidrive is accommodated in a joint housing together with the multi-beam-shaping structure.

5. Multi-beam-shaping structure according to claim 1, wherein the multidrive is formed outside a housing of the multi-beam-shaping structure.

6. Multi-beam-shaping structure according to claim 1, wherein the drive connection consists of or comprises a flexible axle or flexible shaft.

7. Multi-beam-shaping structure according to claim 6, wherein the flexible axle or flexible shaft comprises a rigid axle portion and a universal coupling connection.

8. Multi-beam-shaping according to claim 1, wherein a plurality of drive trains or drive shafts are provided, to which corresponding coupling points are provided, to which a drive connection to a subsequent drive or transmission structure are provided permanently or in a manner which can be switched via coupling structure.

9. Multi-beam-shaping structure according to claim 1, wherein at least one drive train or one drive shaft is provided on which at least two coupling points are provided, via which at least two subsequent drive or transmission structure are driven.

10. Multi-beam-shaping structure according to claim 1, wherein the drive connection comprises a Bowden cable and a sheathed cable, which is longitudinally displaceable in an outer sleeve, or a longitudinally displaceable, resilient connecting rod.

11. Multi-beam-shaping structure according to claim 1, further including an antenna interface for an antenna comprising at least one phase-shifter, and wherein an end, opposite the multidrive, of the drive connection is structured to be attached to the antenna interface for setting at least one phase-shifter provided in the antenna.

12. Multi-beam-shaping structure according to claim 1, wherein an end, opposite the multidrive, of the drive connection is connected via a further mechanical interface to an actuation structure in a coupling housing, which structure is structured to be attached to an antenna interface of an associated antenna configuration for setting at least one provided phase shifter.

13. Multi-beam-shaping structure according to claim 1, wherein the multi-beam-shaping structure comprises at least one communication interface for a plurality of single-band antennae of a multi-band antenna arrangement or for individual sector antennae of a multi-sector antenna arrangement, it being possible to produce a connection to a control device.

14. Multi-beam-shaping structure according to claim 1, wherein the multi-beam-shaping structure is structured to provide lightning protection.

15. Multi-beam-shaping structure according to claim 1, further including an antenna cover and an associated multi-beam-shaping structure housing arranged outside the antenna cover.

16. Multi-beam-shaping structure according to claim 1, further including an antenna cover, wherein the multidrive is also arranged outside the antenna cover.

17. Multi-beam-shaping structure according to claim 1, further including an antenna cover, and wherein the multidrive is arranged completely or in part inside the antenna cover.

18. Multi-beam-shaping structure according to claim 1, further including an antenna structure, and wherein the multi-beam-shaping structure comprises a multi-beam-shaping structure housing structured to lie completely or in part inside the antenna cover.

19. Multi-beam-shaping structure according to claim 18, further including an antenna cover, and wherein the communication interface is also arranged, at least for indirect connection to a base station, completely or in part inside the antenna cover.

20. Multi-beam-shaping structure according to claim 1, further including an antenna and a coupling actuation structure extending from the multi-beam-shaping structure into the interior of the antenna, and structure to selectively switch electromechanical actuators or coupling structure located there, via which subsequent drive, transmission or adjustment structure can be switched on or off.

21. Multi-beam-shaping structure according to claim 1, further including an antenna and plural activation structures, and wherein the drive connection comprises a plurality of rigid shafts or axles and further drive stages for transmitting the flow of force to any desired one of plural actuation structures, in the form of phase shifters, positioned or formed on or in the antenna.

22. Multi-beam-shaping structure according to claim 1, wherein an opposite end of the respective drive connection is structured to be connected at a further interface directly or indirectly to a transmission adjustment structure for setting the radiation differently.

* * * * *